(12) United States Patent
Goderis et al.

(10) Patent No.: US 9,363,100 B2
(45) Date of Patent: Jun. 7, 2016

(54) ACCESS SYSTEM AND NETWORK ARCHITECTURE WITH ACCESS SYSTEM

(75) Inventors: Danny Goderis, Relegem (BE); Stefaan Vanhastel, Dentergem (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1311 days.

(21) Appl. No.: 12/186,633

(22) Filed: Aug. 6, 2008

(65) Prior Publication Data

US 2009/0043894 A1 Feb. 12, 2009

(30) Foreign Application Priority Data

Aug. 10, 2007 (EP) .................................... 07291002

(51) Int. Cl.

| | | |
|---|---|---|
| *G06F 15/167* | (2006.01) | |
| *G06F 7/00* | (2006.01) | |
| *G06F 13/00* | (2006.01) | |
| *H04L 12/28* | (2006.01) | |
| *H04W 72/04* | (2009.01) | |
| *H04L 29/06* | (2006.01) | |
| *G06F 12/10* | (2016.01) | |
| *H04L 12/24* | (2006.01) | |

(52) U.S. Cl.
CPC ........ *H04L 12/2889* (2013.01); *H04L 12/2896* (2013.01); *H04L 41/5054* (2013.01); *G06F 12/1009* (2013.01); *H04L 29/06* (2013.01); *H04L 41/0213* (2013.01); *H04W 72/0453* (2013.01)

(58) Field of Classification Search
CPC ............ G06F 11/3048; G06F 12/1009; Y02B 60/142; H04L 47/822; H04L 29/06; H04W 72/0453

USPC .............. 455/68; 709/226, 225, 215; 711/714
See application file for complete search history.

(56) References Cited

U.S. PATENT DOCUMENTS

| | | | | |
|---|---|---|---|---|
| 5,974,146 A * | 10/1999 | Randle et al. .................... 705/77 |
| 6,052,724 A * | 4/2000 | Willie et al. .................... 709/223 |
| 6,118,976 A * | 9/2000 | Arias et al. ..................... 725/118 |
| 6,553,218 B1 * | 4/2003 | Boesjes ......................... 455/406 |
| 6,594,647 B1 * | 7/2003 | Randle et al. .................... 705/77 |
| 6,690,786 B1 * | 2/2004 | Kowal et al. ............. 379/221.01 |
| 6,845,431 B2 * | 1/2005 | Camble ................. G06F 3/0601 |
| | | 711/152 |
| 7,062,629 B2 * | 6/2006 | Shimada et al. .............. 711/170 |
| 7,065,072 B1 * | 6/2006 | Quiles ................. H04L 41/0806 |
| | | 370/352 |
| 7,203,742 B1 * | 4/2007 | Luft et al. ...................... 709/223 |
| 7,630,360 B2 * | 12/2009 | Schneider et al. ............ 370/352 |
| 7,634,561 B2 * | 12/2009 | Brans et al. .................... 709/224 |
| 7,636,324 B2 * | 12/2009 | Nassar .......................... 370/254 |
| 8,145,873 B2 * | 3/2012 | Zhu et al. ...................... 711/173 |
| 2002/0167938 A1 * | 11/2002 | Wakayama et al. .......... 370/352 |
| 2003/0123274 A1 * | 7/2003 | Camble ................. G06F 3/0601 |
| | | 365/100 |
| 2003/0131073 A1 * | 7/2003 | Lucovsky et al. ............. 709/219 |
| 2004/0044789 A1 | 3/2004 | Angel |
| 2004/0196470 A1 * | 10/2004 | Christiansen ................. 358/1.1 |

(Continued)

*Primary Examiner* — Arvin Eskandarnia
*Assistant Examiner* — Margishi Desai
(74) *Attorney, Agent, or Firm* — Chiesa Shahinian & Giantomasi PC

(57) ABSTRACT

The invention relates to an access system for establishing a connection between a plurality of subscribers and a plurality of service providers, wherein the access system comprises a plurality of partitions each having a number of resources, each partition being suitable for allocation to one of said plurality of service providers and each partition comprising at least one subscriber port, at least one uplink and a forwarding means between said at least one subscriber port and said at least one uplink, wherein the access system is arranged to communicate with a managing operator for managing said plurality of partitions.

10 Claims, 6 Drawing Sheets

(56) References Cited

U.S. PATENT DOCUMENTS

| | | | |
|---|---|---|---|
| 2004/0230768 A1* | 11/2004 | Slegel et al. | 711/206 |
| 2005/0039183 A1* | 2/2005 | Romero et al. | 718/100 |
| 2005/0044228 A1* | 2/2005 | Birkestrand et al. | 709/226 |
| 2005/0108395 A1* | 5/2005 | Brey et al. | 709/225 |
| 2005/0120171 A1* | 6/2005 | Yasukawa | G06F 3/0605 |
| | | | 711/114 |
| 2005/0260997 A1* | 11/2005 | Korale et al. | 455/452.2 |
| 2007/0149137 A1* | 6/2007 | Richardson et al. | 455/68 |
| 2007/0253328 A1* | 11/2007 | Harper et al. | 370/219 |
| 2008/0015712 A1* | 1/2008 | Armstrong et al. | 700/2 |
| 2008/0104222 A1* | 5/2008 | Brans et al. | 709/224 |
| 2008/0221855 A1* | 9/2008 | Hintermeister et al. | 703/20 |
| 2009/0104965 A1* | 4/2009 | House et al. | 463/20 |
| 2009/0198834 A1* | 8/2009 | Crow et al. | 709/245 |
| 2010/0023949 A1* | 1/2010 | Jackson | 718/104 |

* cited by examiner

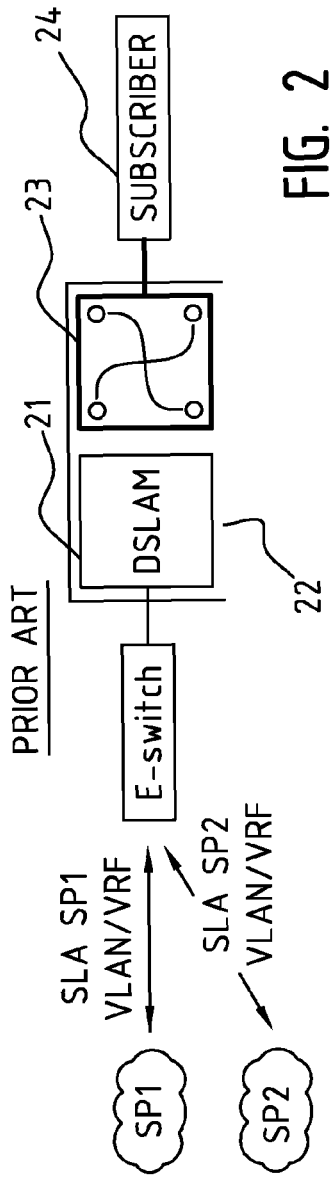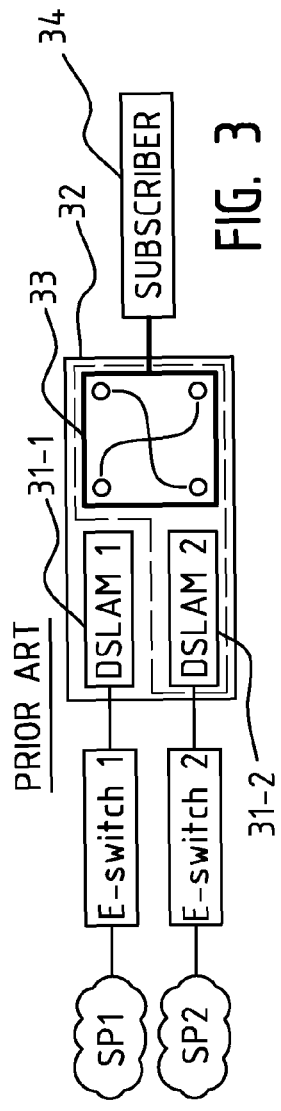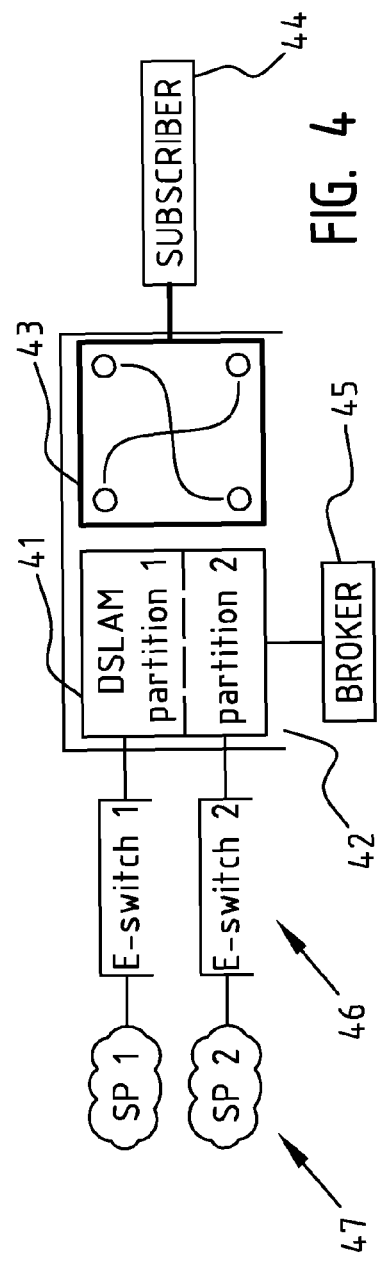

ACCESS SYSTEM AND NETWORK ARCHITECTURE WITH ACCESS SYSTEM

The invention relates to an access system for establishing a connection between a plurality of subscribers and a plurality of service providers, and in particular to an access system, such as a Digital Subscriber Line Access Multiplexer (DSLAM), for space-constrained deployments.

Different end users located in an apartment building with an access system in the basement, or different end users connected to a street cabinet with an access system, may have different service providers. Hence, such an access system must be able to provide a connection between a plurality of subscribers and a plurality of service providers. Therefore, in so called "deep fiber" deployment of Digital Subscriber Line Access Multiplexers (DSLAMs) in cabinets, known as fiber to the node (FTTN), or inside apartment buildings or other multi-user buildings, known as fiber to the building (FTTB), Regulator may require local loop unbundling. At present two solutions exist to allow such an unbundling, as will be discussed below.

FIG. 2 shows a schematic diagram of a first solution, known as the "Wholesale" solution (referred to by the European Commission Regulation as "Market 12" or "service-based competition"). Here "Wholesale" indicates that the provider offers his services to another provider. In this approach typically only one service provider manages, and more in particular owns, installs and maintains DSLAM 21, cabinet 22 and copper loop 23. The managing service provider provides "bit pipe" access to the competitor service providers SP1, SP2, etc. The traffic from the subscriber 24 to a competitor service provider is simply tunneled over the Ethernet/IP network, to the competitor's aggregation network, using for example a virtual local area network (VLAN) or a virtual routing and forwarding (VRF). The leased capacity is described in a service level agreement (SLA). In other words this solution establishes a virtual connection between a competing service provider SP2 and a subscriber (Layer 2/3 level unbundling). While this solution is an acceptable technical solution, Regulators do not like the lack of physical connection between competing service providers and subscribers.

FIG. 3 illustrates schematically a second solution, known as the "Multiple DSLAMs" solution (referred to by the European Commission Regulation as "Market 11" or "Infrastructure-based competition"). According to this concept every service provider SP1, SP2, etc. simply provides his own DSLAM 31-1, 31-2, and the subscriber 34 is connected to the DSLAM 31-2 of his service provider SP2. In the illustrated example DSLAMs 31-1 and 31-2 are built in a shared cabinet 32. In the past, this approach has had a certain success in central office deployments where the available space was not an issue. However, in deployments where only limited space is available, using multiple DSLAMs is not a practical solution. At present an operator using FTTN has two choices: building larger cabinets to accommodate multiple DSLAMs, or allowing the building of multiple cabinets at the same location. It will be clear that both solutions involve additional costs and/or have practical and aesthetical drawbacks. Moreover in case of Multiple DSLAM, the infrastructure owner will likely install an Automatic Distribution Frame (ADF) to switch a subscriber to another service provider. Such an ADF allows the operator to remotely re-patch a subscriber line to another DSLAM when a subscriber changes to another service provider. However, an ADF is expensive and constitutes an additional cost.

In conclusion, Regulators do not like the IP Whole Sale concept, and operators are hesitant to implement the Multiple DSLAM solution. This has lead to FTTN/FTTB deployments being blocked.

The object of the present invention is to provide an access system according to the preamble, allowing a physical connection between a plurality of service providers and subscribers, said access system being simple and compact, and in particular deployable in a location where only limited space is available.

To reach this object, the access system according to the invention is distinguished in that it comprises a plurality of partitions each having a number of resources, each partition being suitable for allocation to one of said plurality of service providers and each partition comprising at least one subscriber port, at least one uplink and a forwarding means between said at least one subscriber port and said at least one uplink, wherein the access system is arranged to communicate with a managing operator, called the broker, for managing said plurality of partitions.

Such an access system allows different service providers to share a single access system, and is in particular convenient in space-constrained deployments such as cabinets. Further, if a subscriber needs to be switched to another service provider, this can simply be done by re-allocating a subscriber to another partition.

According to an advantageous embodiment of the invention the access system comprises a partition management means arranged to communicate with the managing operator for creating and deleting partitions and for allocating resources to partitions. Such a partition management means can also be implemented outside the access node in the network architecture, for example in the management system of the managing operator. Preferably the partition management means comprises a table with an overview of all the partitions and the resources assigned to these partitions, said table being configurable by the managing operator. For facilitating the communication between the different functional blocks, especially when not all the function blocks are located in the access system, copies of this table may be kept at different locations.

According to a further developed embodiment of the invention the access system comprises a management access controller providing a management interface to the plurality of service providers and controlling the management requests of each provider. Again, this functionality could also be implemented in external software, for example in the management system of the managing operator, or in the management system of each of the plurality of service providers. If the former solution is opted for, preferably the North-bound interface is used for communication between the plurality of services providers and the management access controller in the management system of the managing operator. In that way only the managing operator has direct access to the node, and there is e.g. no CLI (Command Line Interface) or SNMP (Simple Network Management Protocol) access to the node for the service providers.

A further embodiment of the invention allows the management of the usage of the common resources, such as MAC addresses, backplane capacity, etc. of the access system, wherein the partition management means is arranged for assigning usage of the common resources to the partitions, and the access system comprises a common resource controller for controlling access to the common resources in function of the assigned usage. In that way the shared resource usage by a partition can be limited in accordance with the assigned usage.

The accompanying drawings are used to illustrate presently preferred non-limiting, exemplary embodiments of the present invention. The above and other advantages, features, and objects of the invention will become more apparent and the invention will be better understood from the following detailed description when read in conjunction with the accompanying drawings in which:

FIG. 2 is a simplified schematic diagram of a the "IP Wholesale" concept of the state of the art;

FIG. 3 is a simplified schematic diagram of a the "Multiple DSLAMs" concept of the state of the art;

FIG. 4 is a simplified schematic diagram of an embodiment of a communication system of the present invention;

Figure 7A:
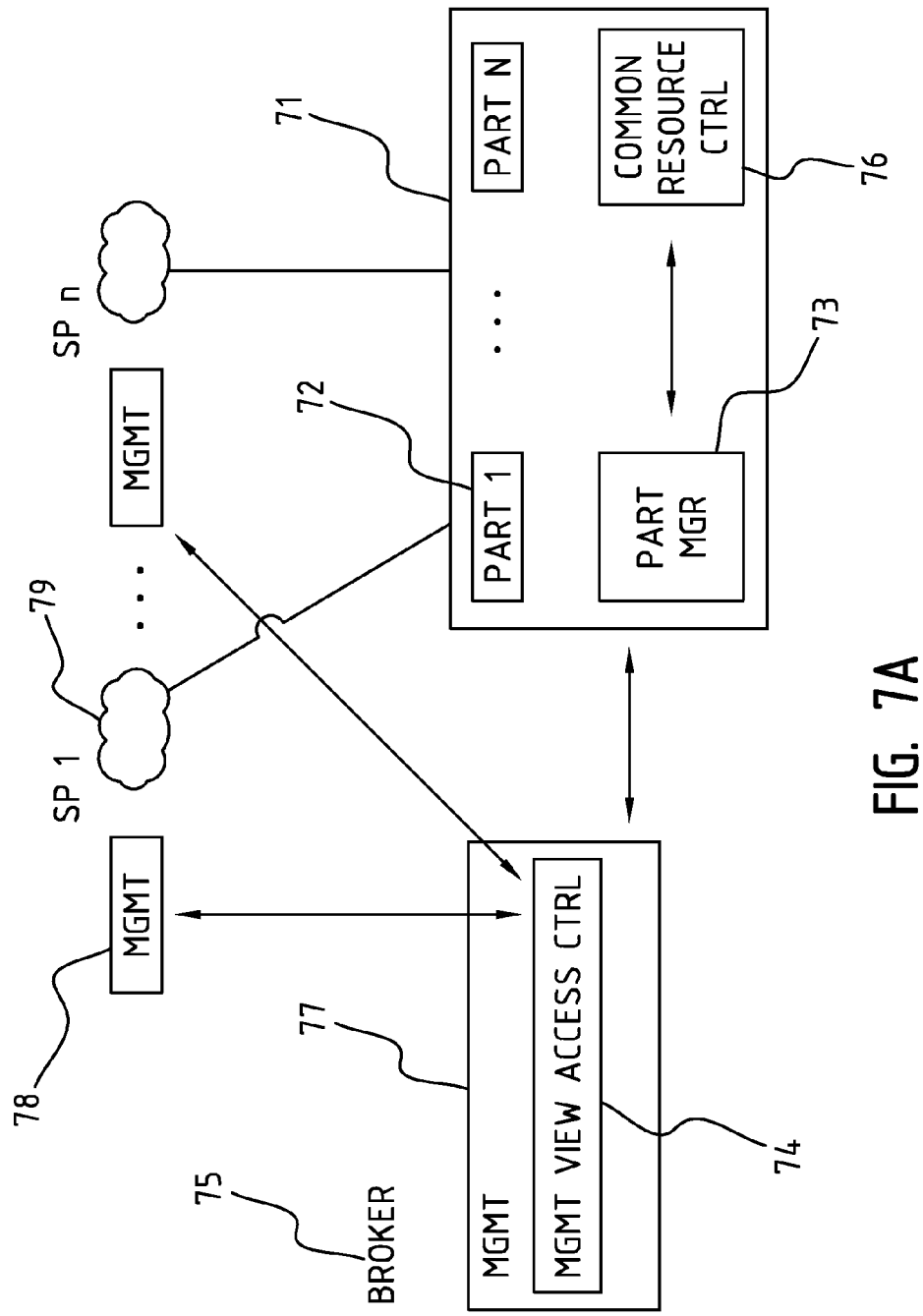

FIGS. 7A and B are schematic diagrams illustrating the functional blocks of the DSLAM in a network architecture, according to a second and third embodiment of the invention using the "hybrid" solution, respectively.

Figure 1:
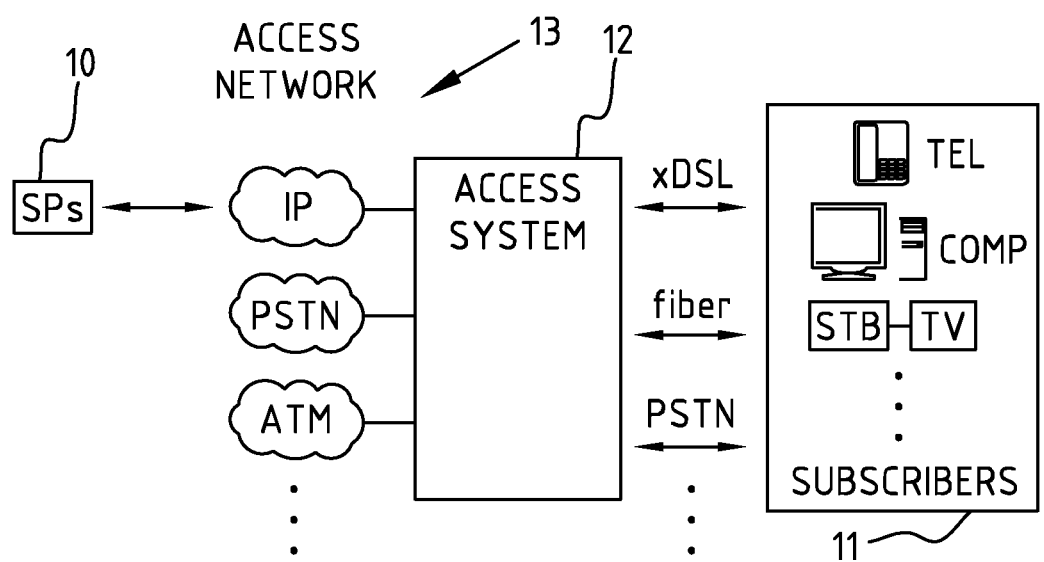
FIG. 1 is a simplified block diagram of a communication system according to the state of the art.

FIG. 1 shows a typical telecommunications access network being a distributed arrangement of communication facilities between service providers (SPs) 10 and end users 11. An end-user may have a variety of subscriber data processing systems (PCs, set-top boxes STBs, etc.).

An access system or access node 12, such as DSLAM, is used to deliver data from a service provider via an aggregation network to a subscriber (end-user). A variety of DSL (xDSL) systems exist, e.g. HDSL (high bit rate), SDSL (symmetric DSL), RADSL (Rate Adaptive DSL), ADSL (Asymmetric DSL), VDSL (very high bit rate DSL). At present mainly ADSL, VDSL and SHDSL are used. Each end-user generally has a host computer or set-top box with a viewing device, connected by means of customer premises equipment (CPE) such as a DSL modem, to the DSLAM. Offering a subscriber service via a service delivery platform hosted by a DSLAM presents a number of application specific resource management issues, such as bandwidth and quality of service (QoS) requirements. In that regard every DSLAM typically comprises a functional block with a virtual router/switch/forwarder which is configurable by the operator.

FIGS. 2 and 3 show two solutions for local loop unbundling according to the state of the art, and have been discussed above.

FIG. 4 illustrates schematically the concept of the invention. The invention will be illustrated for a DSLAM, but the skilled person will understand that any access technology may be used, such as GPON, P2P fiber, etc. According to the embodiment of FIG. 4 the resources of the DSLAM 41 are partitioned, and each partition is assigned to a different service provider. In the example of FIG. 4 service provider SP1 is assigned a first partition of the DSLAM 41, and service provider SP2 is assigned a second partition. Each service provider is allowed to manage his own partition.

Preferably the management by the service provider takes place as if the DSLAM were a normal stand-alone DSLAM. This means that the management of e.g. physical layer parameters on a subscriber port, Quality of Service (QoS), security, etc. is not changed.

The creating and management of the partitions is typically controlled by a third party or by one of the service providers, called the managing operator or "the broker" 45. In that way subscriber 44 can be physically connected to either one of the service providers SP1; SP2 by means of the copper 43, a single DSLAM 42, the corresponding Ethernet switch 46 and service provider network 47. The management performed by the broker 42 typically consists of assigning and moving resources to the different partitions, and assigning partitions to the service providers. According to an advantageous embodiment, the broker is also responsible for overall system management including alarms, powering, temperature, etc.

Figure 5:
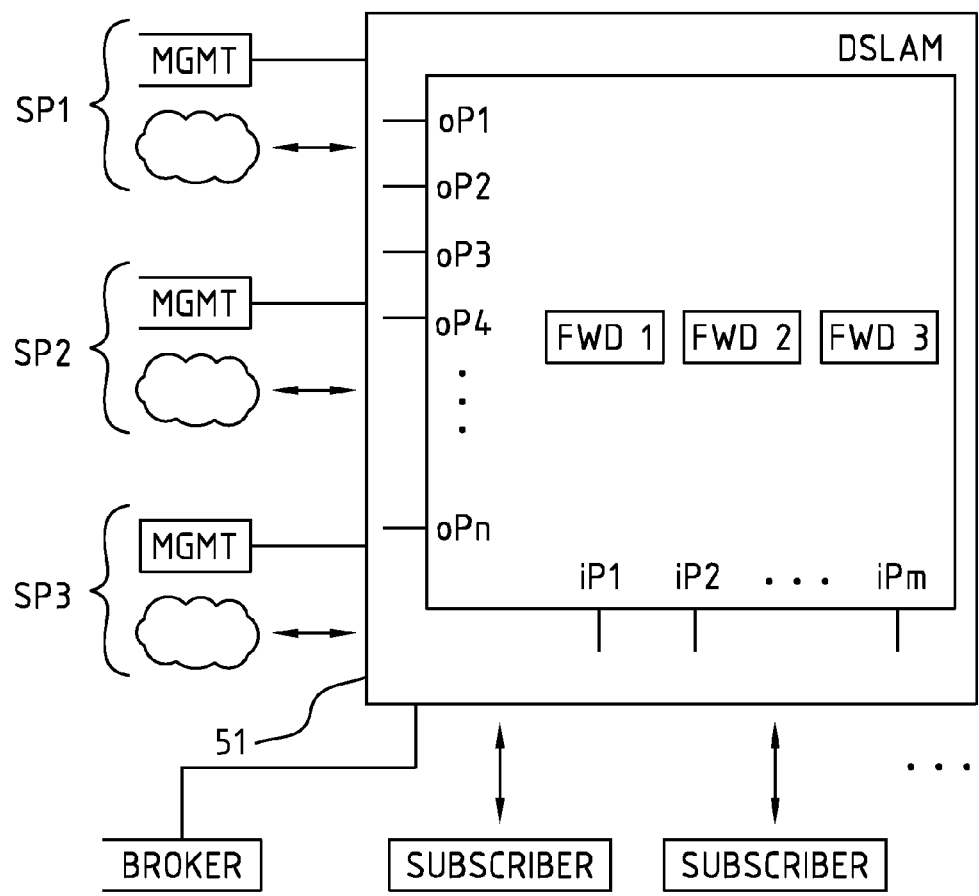
FIG. 5 is a more detailed schematic diagram of the basic resources of the DSLAM of FIG. 4.

FIG. 5 shows schematically an example of a DSLAM 51 with three partitions according to the invention. Each partition comprises a number of dedicated resources:

one or more dedicated input ports iP1-iPm (i.e. subscriber ports, e.g. DSL, fiber such as P2P fiber, POTS, or PSTN ports); the input ports are typically grouped in the form of line terminations cards (LTs) each comprising a number of input ports. Each LT is essentially a DSL card which manages termination of DSL connections of data streams towards its customers premise equipment (CPE) such as a DSL modem. In principle input ports can be divided over the partitions in any way, wherein a first service provider will for example receive 3 ports on a first card and a number of ports on a second card. Another option would be to allocate a complete card to a service provider. This has the advantage that the service provider can be made responsible for the card.

one or more dedicated output ports oP1-oPn (i.e. network terminations NT or uplinks to the aggregation network, typically an Ethernet Metropolitan Area Network, EMAN), and one or more dedicated forwarding means FWD1, FWD2, FWD3 (forwarding engines for traffic handling and forwarding) between the input and output ports.

In other words, each service provider is given exclusive access to part of the resources of the DSLAM, wherein part of these resources are grouped in a partition of the DSLAM comprising a number of subscriber ports iP, one or more forwarding engines FWD, and a number of uplinks oP. In that way multiple providers can share a single DSLAM.

Note that each partition is also typically arranged to use part of the common resources, such as MAC addresses, backplane capacity, system logging, etc.

Preferably each partition should offer full management access to the assigned resources. This will be further elucidated below with reference to FIGS. 6 and 7.

The functional blocks used to implement the invention, in particular a block to communicate with a managing operator (the broker) for managing said plurality of partitions, and a block to provide an interface to the service providers, can be arranged directly in the access system or can be arranged partly in the access node and partly in the network. The first solution will be referred to as the "all in the node" solution and the latter as the "hybrid" solution.

Figure 6:
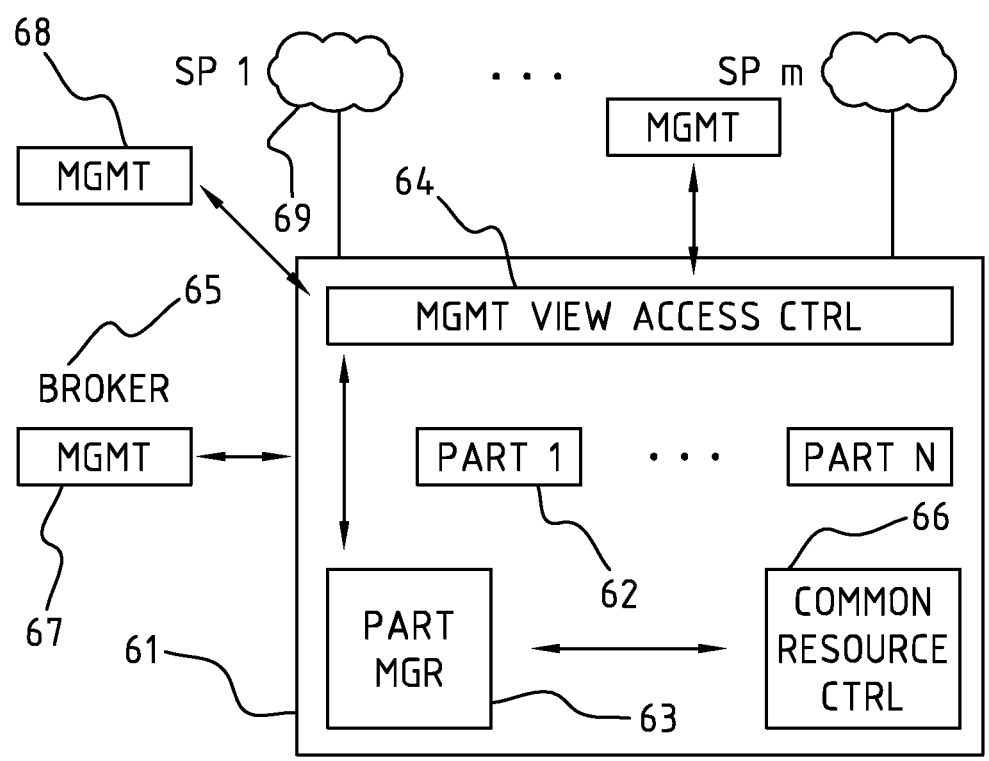
FIG. 6 is a schematic diagram illustrating the functional blocks of the DSLAM in a network architecture, according to a first embodiment of the invention using the "all in the node" solution.

FIG. 6 shows a block diagram illustrating the different functional blocks in a first embodiment of an access system 61 of the invention in which the "all in the node" solution is used. In this embodiment all the management functionalities have been implemented in the DSLAM, but the skilled person will understand that part or all of the functionalities can be provided for outside the DSLAM, as will be explained below with reference to FIG. 7.

The access system of FIG. 6 comprises n partitions 62, a partition manager 63, a management view access controller 64, and a common resource controller 66. Each service provider SP1-SPm is shown with his management system 68 and aggregation network 69.

The partition manager 63 is arranged for managing the plurality of partitions 62, and typically allows to the broker 65 to create, manage and delete partitions, to allocate resources to partitions, and to assign usage of the partitions to service providers. According to a first possibility the partition manager could provide a separate interface for access by the broker 65. Another option would be to provide access to the partition manager 63 through the generic management interface, i.e. via the management view access controller 64 which will be discussed in the next paragraph.

Further the partition manager keeps track of the resources assigned to the partitions, for example in a table with an overview of all the partitions and the assigned dedicated and common resources, which table is configurable by the broker 65. The communication between broker 65 and the access system can take place in any suitable way, using for example the normal management interfaces, such as SNMP (Simple Network Management Protocol), TL1 (transaction Language 1), CLI (Command Line Interface), etc. To make the system more user-friendly a GUI (Graphical User Interface) can be provided separately or in the management system of the broker, so that partitions may be managed in a convenient way. The GUI will then communicate the settings to the partition manager, e.g. via SNMP. Other possibilities would be that the broker configures the partition manager manually, e.g. using the command line or that the partition information is filled out via the standard management system of the broker and is then sent to the access system.

The management view access controller 64 offers a management interface to a service provider SP1, SP2 to manage his assigned partition, including e.g. full access to subscriber line parameters, forwarding engines and uplink parameters, etc., and communicates with the management system 68 of the service providers SP1, SP2. The management view access controller 64 works as a filter controlling for every management request whether the requested action is authorized. For performing this controlling, the management view access controller typically consults the table in the partition manager 63.

Additionally the management view access controller 64 may provide full system management access to the broker 65 for shared system parts such as powering, temperature control, alarms, etc.

The common resource controller 66 is arranged for giving the partitions access to the common or shared resources, in accordance with the assigned usage indicated in the table in the partition manager 63. In other words the common resource controller will limit shared resource usage to the assigned part (example given, 25% of MAC addresses, 0.5 Gbps of backplane capacity).

Now two possible embodiments implementing the "hybrid" solution will be discussed with reference to FIGS. 7A and B.

In the embodiment of FIG. 7A, the management view access controller 74 is provided in the management system 77 of the broker 75 and not in the access system. The management systems 78 of the service providers SP1-SPn can for example communicate with the management view access controller 74 using the North-bound Interface on the management system 77 of the broker. In that way only the broker has direct access to the access system.

In the embodiment of FIG. 7A it may be preferable to keep a copy of the table of the partition manager in the management system 77 of the broker 75 in order to avoid that requests need to be send for every parameter separately.

Figure 7B:
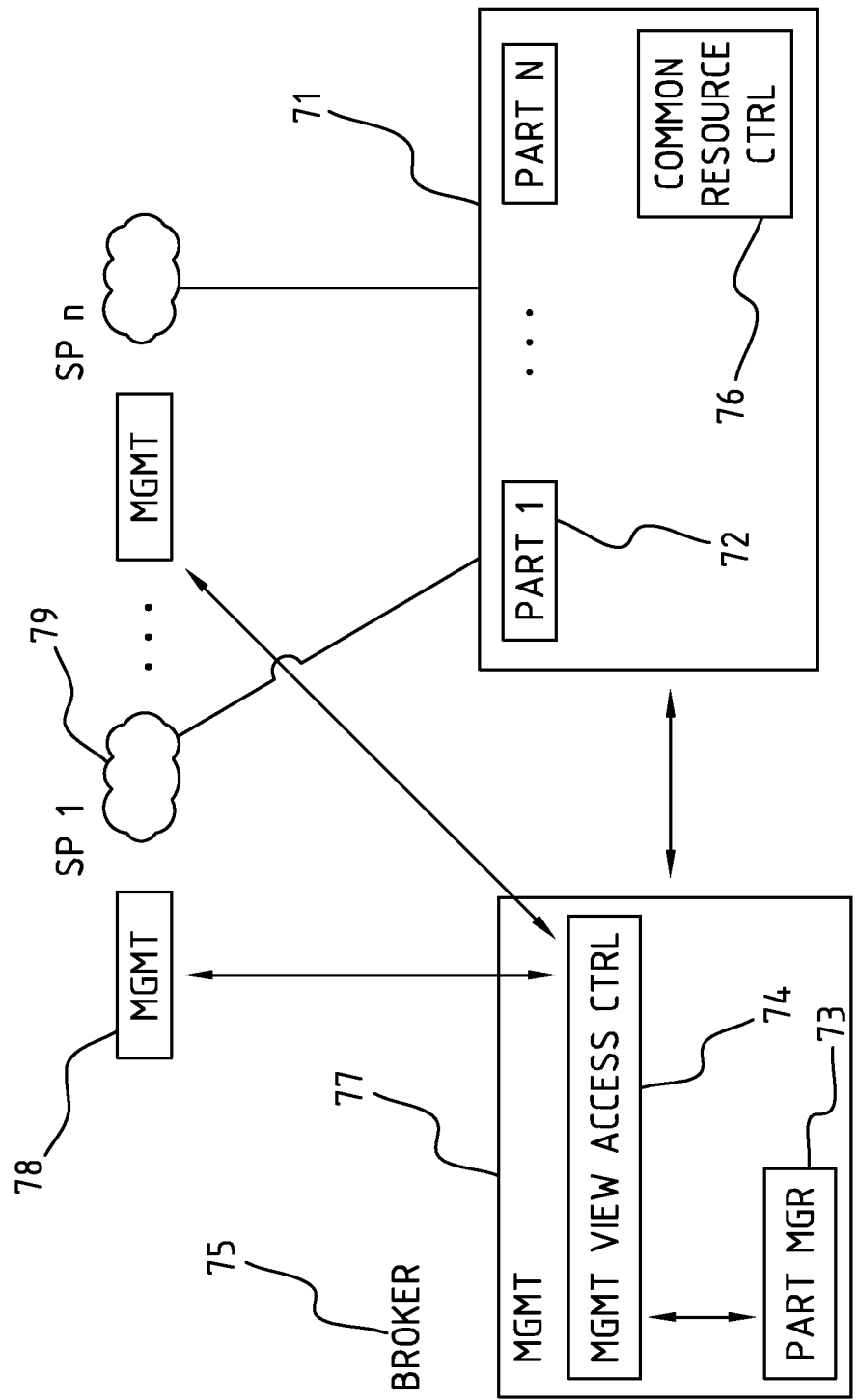

In the embodiment of FIG. 7B both the management view access controller 74 and the partition manager 73 are implemented in the management system 77 of the broker 75. In such an embodiment it may be preferable to keep a copy of the table of the partition manager 73 in the access system. In that way it is avoided that the common resource manager has to send numerous requests to the management system 77 of the broker 75.

Note that other "hybrid" solutions exist, and that the management view access controller could also be provided in every single management system of the service providers. However from a security point of view this solution has certain disadvantages. Also the Broker will have to make sure that any changes to the partitions are communicated to the different service providers.

While the principles of the invention have been set out above in connection with specific embodiments, it is to be clearly understood that this description is merely made by way of example and not as a limitation of the scope of protection which is determined by the appended claims.

The invention claimed is:

1. An access node for establishing a connection between a plurality of subscribers and a plurality of service providers, wherein the access node comprises:
   a plurality of partitions, each having a number of resources, each partition being suitable for allocation to one of said plurality of service providers, respectively, and each partition comprising at least one subscriber port, at least one uplink and at least one forwarder between said at least one subscriber port and said at least one uplink, wherein the access node is arranged to communicate with a managing operator for managing said plurality of partitions,
   a plurality of common resources comprising media access control (MAC) addresses, backplane capacity, and system logging, wherein a partition manager creates and deletes partitions and assigns usage of the common resources to the partitions, the partition manager comprising a table indicating dedicated and common resources assigned to each of the plurality of partitions,
   a common resource controller which controls access to the common resources as a function of the assigned usage, and
   a management access controller configured to:
      provide a management interface to the plurality of service providers to enable each of the plurality of service providers to manage their respective partition, and
      authorize each requested action based on an association between each of the plurality of partitions and the respective at least one subscriber port, at least one uplink, and at least one forwarder in the table.

2. The access node according the claim 1, wherein the access node comprises the partition manager which communicates with the managing operator for creating and deleting partitions and for allocating resources to partitions.

3. The access node according to claim 2, wherein the table includes an overview of all the partitions, said table being configurable by the managing operator.

4. The access node according to claim 2, wherein there is provided a graphical user interface (GUI) for configuring the partitions, said GUI being arranged to communicate with the partition manager.

5. The access node according to claim 1, wherein the management access controller controls the management requests of each provider.

6. The access node according to claim 1, wherein the access node is arranged to communicate with the managing operator using at least one from among the following ways: SNMP (Simple Network Management Protocol), TL1 (Transaction Language 1), and CLI (Command Line Interface).

7. Network architecture comprising an access node according to claim 1, wherein the network architecture comprises a management system of the managing operator, said management system comprising a partition manager for creating and deleting partitions and for allocating resources to partitions, said partition manager being arranged to communicate with the access node.

8. Network architecture comprising the access node according to claim 1, wherein the network architecture comprises a management system of the managing operator, said management system comprising a management access controller providing an interface to the plurality of service providers and controlling the management requests of each provider.

9. Network architecture according to claim 8, the management system of the managing operator having a North-bound interface, wherein the North-bound interface is used for communication between the plurality of services providers and the management access controller.

10. The access node according to claim 1, wherein the access node is a Digital Subscriber Line Access Multiplexer (DSLAM).

* * * * *